Oct. 14, 1958 D. D. PEEBLES 2,856,288
PECTIN PRODUCT AND PROCESS OF MANUFACTURE
Filed April 11, 1956
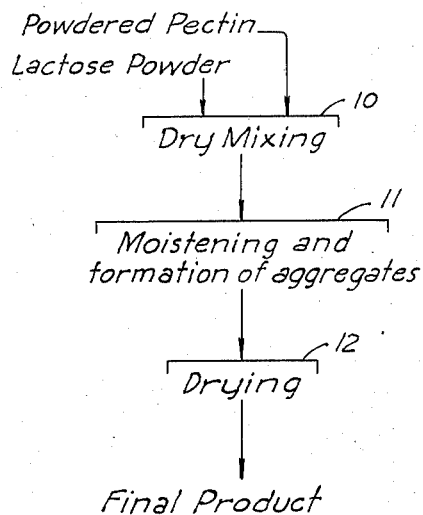
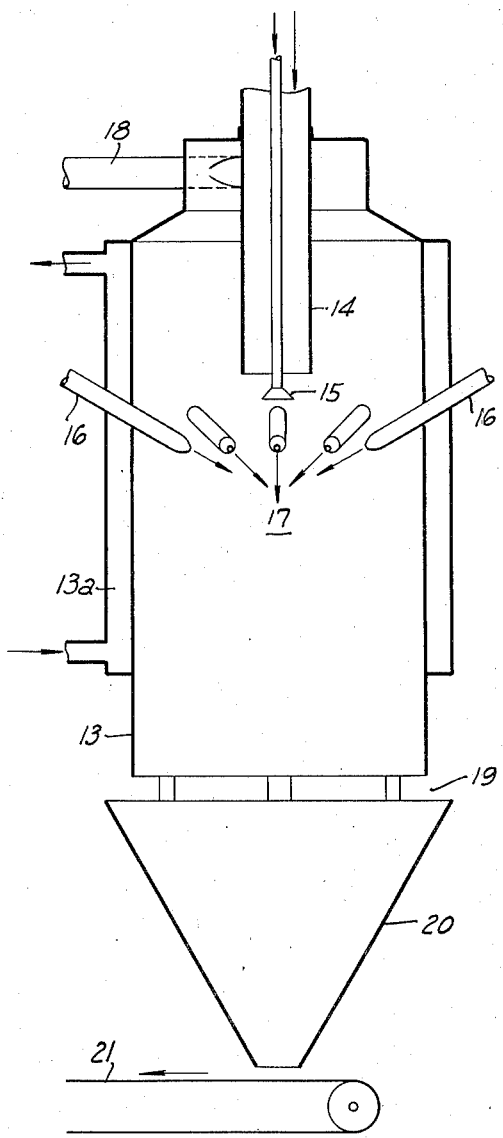
INVENTOR.
David D. Peebles
BY
ATTORNEYS

United States Patent Office 2,856,288
Patented Oct. 14, 1958

2,856,288

PECTIN PRODUCT AND PROCESS OF MANUFACTURE

David D. Peebles, Davis, Calif., assignor, by mesne assignments, to Foremost Dairies, Inc., San Francisco, Calif., a corporation of New York Application April 11, 1956, Serial No. 577,466

9 Claims. (Cl. 99—132)

This invention relates generally to pectin containing products and processes for their manufacture.

Commercial pectin is derived mainly from apple and citrus fruit, and is widely used as a jell forming agent in the food industry. It is commonly marketed in the form of a finely divided dry powder having a moisture content of the order of 10%. In bulk such powdered pectin is not free flowing, and it does not readily disperse in water. When a quantity of such powder is introduced into either cold or hot water and the mixture stirred, sticky lumps are formed which must be broken up by vigorous agitation to complete dispersion. It will be evident that this characteristic is undesirable, particularly in that it makes dispersion difficult and time consuming.

In general it is an object of the present invention to provide a pectin product which can be readily dispersed in either cold or hot water, by simple stirring.

A further object of the invention is to provide a product of the above character which in addition to being readily dispersible in water, is a free-flowing granular material.

Another object of the invention is to provide a novel process for manufacturing a pectin product, and which does not in any way injure or impair its jell forming power.

Additional objects and features of the invention will appear from the following description in which the preferred embodiment has been set forth in detail in conjunction with the accompanying drawing.

Referring to the drawing:

Figure 1 is a flow sheet illustrating one way in which the process can be practiced.

Figure 2 schematically illustrates equipment for carrying out the moistening and aggregating operation.

In general the process of the present invention involves operations in which a powdered pectin or pectin containing material is moistened and caused to be aggregated. The resulting aggregates are then dried in such a manner as to leave the aggregates intact. Preferably the moistening operation and the formation of aggregates are carried out while the material is moving in free flight through a treatment zone. Although the process can be carried out upon pectin by itself, I prefer that the pectin be combined with lactose powder before being subjected to the moistening and aggregating operation.

A suitable procedure for carrying out the invention is outlined in the flow sheet of Figure 1. A powdered pectin is provided which may have a moisture content of the order of 10% or less, and which is relatively finely divided with respect to its particle size. For example the bulk of the particles can be of such size that they pass through a 100 mesh sieve (U. S. Standard). In conventional methods for the manufacture of dry powdered pectin, a liquid pectin concentrate is prepared and reduced to dry powder of the desired moisture content and particle size. Roll driers can be employed for drying, followed by grinding the dried material. Also suitable spray driers can be employed, with proper control to provide a dry powder such that the bulk of the material readily passes through a 100 mesh screen. Such a dried powder may have a moisture content ranging from about 4 to 10%, depending on the drying procedure.

In Figure 1 a dry powdered pectin produced as described above is supplied to the dry-mixing operation 10, together with lactose powder. The amount of lactose employed may vary considerably, although for best results I prefer that the final product contain from 40 to 50% lactose. The lactose powder should be of good edible grade, and should have a particle fineness comparable to what is produced by conventional spray drying methods. Lactose powder can be produced by spray drying in the anhydrous or amorphous form, in that the lactose is not hydrated to any substantial extent. In addition to anhydrous lactose powder, there is available a form of lactose powder in which the majority of the lactose is hydrated and crystallized in the form of alpha lactose monohydrate. I prefer to use a blend of both anhydrous and hydrated lactose powder. Thus with respect to the total amount of lactose used, about 5 to 50% can be in the hydrated form, and the remainder anhydrous.

In the dry mixing operation 23 the pectin and lactose powders are homogeneously intermixed. This dry mix is then subjected to the moistening and aggregating operation 11 where moist porous aggregates are formed having a size considerably greater than that of the original powder particles. In step 12 the excess moisture is removed from the moist aggregates without any appreciable amount of crushing or grinding. The final product may have a moisture content (total) ranging from 6 to 10%.

The moistening and aggregating operation can be carried out by the use of apparatus such as shown in Figure 2. This apparatus consists of an upright chamber 13 having a downwardly discharging conduit 14 for the introduction of powder together with a stream of conveying air. Adjacent the lower open end of conduit 14, there is a nozzle 15 connected to a water pipe and adapted to produce a finely atomized spray of water. A plurality of pipes 16 extend through the sides of the chamber at a level below the lower end of conduit 14, and are connected to a source of steam at substantially atmospheric pressure. By virtue of the introduction of steam (i. e. warm water vapor), together with atomized water from the nozzle 15, a moist treatment zone 17 is established through which the particles of powder progress in free flight (i. e. dispersed in the air stream) after being introduced through the conduit 14. The powder particles within the treatment zone 17 are moistened whereby they are made sticky, and are brought into random physical contacts to cause them to adhere together in the form of random aggregates. The temperature within the treatment zone can be of the order of from 80 to 140° F., about 130° being considered optimum.

A conduit 18 connects with the upper end of the chamber, and continuous controlled exhausting of air from this conduit serves to draw cool atmospheric air into the lower end of the chamber, through the opening 19 between the lower end of the chamber and the collecting hopper 20. Thus the aggregates from zone 17 are contacted with cooler air. A jacket 13a can be supplied with warm air to heat the side walls of the container, thus avoiding condensation on the inner chamber surfaces. The temperature of the aggregates leaving the chamber 13 can be of the order of about 110° F., with a moisture content (total) of the order of from 18 to 36% (optimum about 22%). The discharging material is directed by hopper 20 upon a suitable conveying means 19, such as one of the belt type. This conveyor moves the material to suitable drying equipment, where excess moisture is removed. A time period of from 30 to 90 seconds is provided in transit, during which some firming of the soft aggregates occurs. The drying equipment should be such that it does not materially crush or grind the material during drying. A suitable drier is one of the shaker type having a perforated screen which is vibrated to cause the material deposited on the same to progress from one end to the other, and which is arranged whereby warm dry air is delivered to the lower side of the screen to discharge upwardly through the screen perforations and through the layer of material being dried, thereby causing a levitating effect on the working layer or bed of material. The drying air can be supplied at a suitable temperature ranging for example from 250 to 300° F.

The pectin product obtained in accordance with the foregoing method is a free-flowing granular powder, and may be readily poured from a container in which it is stored. In a typical instance the size of the particles may be such that all or the major part of the material passes through a 20 mesh screen, but is retained on an 80 mesh screen. A small amount of fine material, such as will pass an 80 mesh screen, may be rejected.

The particles of the product are porous aggregates formed by random attachment between the original particles of the powdered pectin and lactose. Wettability is relatively high, and the product is non-caking (i. e. non-hygroscopic) when exposed to the atmosphere. Also it is completely free-flowing. For typical products the bulk density ranges from about 340 to 450 grams per liter.

In contrast with conventional commercial pectin powder, the product can be readily dispersed in either hot or cold water with simple stirring, and without formation of sticky lumps.

The processing described above does not have any detrimental effect upon the pectin. Thus the final product has the full jell making power possessed by the original pectin powder. Although it is well known that heat tends to destroy the jell making power of pectin, in the present method time and temperature factors are so controlled that the heat to which the pectin is subjected while undergoing treatment in the apparatus of Figure 2, does not detrimentally affect its jell making properties.

Although the product made in accordance with the foregoing method contains a substantial amount of lactose, in many instances lactose can be tolerated or may be desirable, as for example where the pectin is used in the manufacture of jams or jellies, and the sugar content of the formulation modified accordingly.

By way of example, in one specific instance the invention was practiced as follows: A dry citrus pectin was employed having a moisture content of 9%, with a particle size such that the bulk of the powder passed through a 100 mesh screen. The dry pectin powder was intermixed with spray dried lactose powder (of comparable particle fineness) in proportions corresponding to 25 pounds of pectin powder, 22.5 pounds of anhydrous lactose, and 2.5 pounds of hydrated lactose. The apparatus of Figure 2 was operated with warm air being circulated through the jacket 13a, to maintain the walls of the treatment chamber at a temperature of the order of about 130° F. Air at a temperature of 120° F. was used to convey the dry mix through conduit 18 into the top of the apparatus. Hot water at a temperature of about 180° F. was supplied to the atomizing nozzle 15, and saturated steam was supplied to the jets 16. The proportioning between introduction of steam and atomized water was such as to produce an average temperature in zone 17 of about 130° F. Also the amount of moisture introduced by way of nozzle 17 and pipes 16, was such as to provide a total moisture content of 22% (total) for the aggregates discharging from the apparatus upon the conveyer 21. The length and speed of operation of belt conveyer 21 was such as to permit the aggregates to remain as an uncompact mass during transit for a period of 60 seconds, before being delivered to the finishing drier. During this period of transit the aggregates became noticeably firmer and less sticky, and formed a free-flowing mass as delivered to the finishing drier. The inlet drying air to the finishing drier was about 290° F., and the moisture content of the material was reduced to 10% (total).

The product obtained in the foregoing example had a bulk density of 380 grams per liter. The results of a screen analysis of the material leaving the finishing drier, were as follows:

|  | Percent |
|---|---|
| On 28 mesh | 1.4 |
| Thru 28 mesh on 35 mesh | 12.7 |
| Thru 35 mesh on 42 mesh | 8.6 |
| Thru 42 mesh on 60 mesh | 32.1 |
| Thru 60 mesh on 80 mesh | 27.9 |
| Thru 80 mesh on 100 mesh | 12.7 |
| Thru 100 mesh | 4.6 |

For a commercial product the fine material passing through a 100 mesh screen could either be rejected or retained depending upon customer requirements.

The product in the foregoing example had all of the desirable characteristics previously described. It readily dispersed in either hot or cold water, without violent agitation, and without the formation of lumps.

Instead of introducing all of the lactose into the dry mixing operation a substantial amount can be blended with pectin in a preceding stage of the process. For example some lactose concentrate can be intermixed with the pectin concentrate, and the blend supplied to the spray drier or other equipment employed for producing the pectin powder. In the dry mixing operation the amount of added lactose powder is reduced accordingly. When lactose is so blended with the pectin it appears in the pectin powder in the anhydrous form. Therefore the reduction in lactose powder supplied to the dry mixing operation may be taken primarily from the anhydrous lactose content. If desired the amount of lactose concentrate blended with the pectin can be such that in the dry mixing operation only hydrated lactose powder need be added. In other words all of the anhydrous lactose can be produced by blending lactose concentrate with the pectin, thus making it unnecessary to supply further anhydrous lactose to the dry mixing operation. The practice thus described does not materially affect the properties of the final product, insofar as ready wettability and ease of dispersion in water are concerned.

In some instances the amount of lactose indicated above as being desirable (i. e. 40 to 50% of the final product) may be objectionable. The process can be carried out by the use of smaller amounts of lactose (e. g. from 20 to 40%), although the amount of agitation required to avoid lumps appears to increase with decreasing amounts of lactose. In fact a product can be made consisting entirely of a pectin, and which is an improvement over conventional pectin powder insofar as ease of wettability and dispersion in water, and free-flowing characteristics, are concerned. Assuming that such a product is desired, the pectin powder is supplied directly to the apparatus of Figure 2, with this apparatus being operated substantially as previously described. The amount of steam and water introduced into the treatment chamber can be such that the moist porous aggregates leaving this equipment and being deposited upon the conveyer 21, have a total moisture content of the order of from 18 to 25%.

This application is a continuation-in-part of my co-pending application Serial No. 550,679, filed December 2, 1955, now abandoned.

I claim:
1. In a process for the manufacture of a dry pectin product having the property of quickly dispersing in water, applying moisture to finely divided pectin particles while the particles are freely moving in dispersed condition in a treatment zone, whereby the particles are caused to be sticky, causing the sticky particles to contact while in dispersed condition whereby they adhere together in the form of moist porous aggregates, and then subjecting said aggregates to drying without substantial crushing of the same to form a free flowing product.

2. A process as in claim 1 in which the temperature level in said treatment zone is of the order of 80 to 140° F.

3. A process as in claim 1 in which the amount of moisture added in the treatment zone is sufficient to provide the moist porous aggregates with a moisture content on the order of from 18 to 36%.

4. In a process for the manufacture of a pectin product having the property of quickly dispersing in water, forming a mixture of dry pectin powder and powdered lactose, applying moisture to the finely divided particles of said mixture while the particles are freely moving in dispersed condition in a treatment zone, causing the particles to contact and adhere together while dispersed to form moist porous aggregates, and then subjecting said aggregates to drying without substantial crushing of the same to form a free flowing product.

5. A process as in claim 4 in which a portion of the lactose is anhydrous and another portion hydrated.

6. A process as in claim 4 in which the temperature level in said treatment zone is of the order of from 80 to 140° F.

7. A process as in claim 4 in which the amount of moisture added in the treatment zone is sufficient to provide from 18 to 36% moisture in the moist porous aggregates.

8. In a process for the manufacture of a dry pectin product having the property of quickly dispersing in water wihtout formation of lumps, continuously supplying a mixture of dry pectin powder and dry powdered lactose to a treatment zone, a part of the lactose being anhydrous and a part being in the form of alpha lactose monohydrate, causing the particles of the mix to progress through said zone in dispersed condition, continuously supplying moisture to said zone whereby the particles are caused to take up moisture while in dispersed condition and contact together to form moist random aggregates, the temperature within said zone being of the order of about 80 to 140° F. and the amount of moisture being added to the particles being such that the resulting moist porous aggregates contain from 18 to 36% moisture, removing the moist porous aggregates from said zone and then removing excess moisture from the same while leaving the aggregates substantially intact.

9. As a new article of manufacture, a dry pectin product in the form of porous aggregates, each aggregate comprising finely divided particles of dry pectin powder intermixed with particles of dry powdered lactose, the particles of the aggregates being firmly adhered together by means of random attachments.

References Cited in the file of this patent

UNITED STATES PATENTS

| | | |
|---|---|---|
| 1,368,792 | Goodwin | Feb. 15, 1921 |
| 1,394,035 | MacLachlan | Oct. 18, 1921 |
| 1,977,945 | Jameson et al. | Oct. 23, 1934 |
| 2,019,363 | Schulz | Oct. 29, 1935 |
| 2,174,734 | Chuck | Oct. 3, 1939 |